Oct. 5, 1965 M. P. HOGUE 3,210,577
ENCAPSULATED ELECTRIC MOTOR
Filed July 31, 1962 2 Sheets-Sheet 1

INVENTOR.
MARCUS P. HOGUE
BY Richard L. Caslin
HIS ATTORNEY

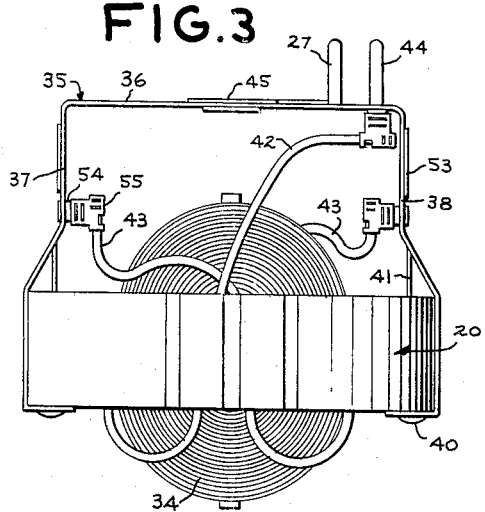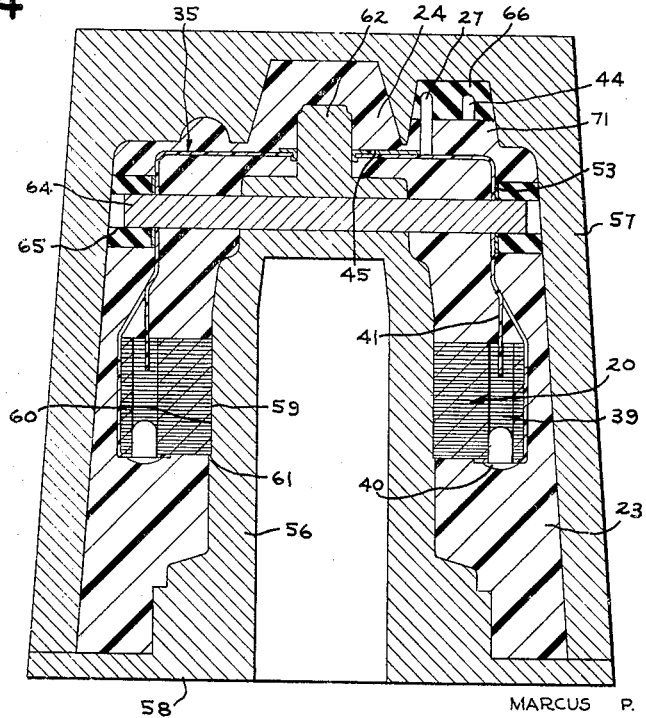

United States Patent Office 3,210,577
Patented Oct. 5, 1965

3,210,577
ENCAPSULATED ELECTRIC MOTOR
Marcus P. Hogue, Hendersonville, N.C., assignor to General Electric Company, a corporation of New York
Filed July 31, 1962, Ser. No. 213,685
3 Claims. (Cl. 310—43)

This invention relates to electric motors and particularly to an encapsulated series motor that is especially adapted for use with a portable food waste disposer.

This invention is an improvement in the construction of the motor for the portable food waste disposer that is disclosed and claimed in U.S. Patent 3,094,291 issued to Lindstrom et al. on June 18, 1963 which is assigned to the General Electric Company, the same assignee as in the present invention. In this portable food waste disposer, the unit is divided into two parts; namely, a hopper which will include the comminuting means that is fastened or secured therein, and the second part a removable power unit that is attached to the mouth of the hopper and provides the driving power for the comminuting means. The kitchen waste must be comminuted in the presence of water so as to obtain a flowable mixture that may be flushed into the sewer system provided in the home. Accordingly, during the operation of this disposer in a kitchen sink water must be supplied continuously to the hopper. This water flowing down past the motor into the hopper constitutes a potential electrical hazard which must be given serious consideration in the design of the motor.

A principal object of the present invention is to provide an encapsulated electric motor design for use with a portable food waste disposer so the motor is water-tight as well as free of electrical hazards when the disposer is operated under the faucet in the kitchen sink.

A further object of the present invention is the provision of a wiring harness in an encapsulated series motor for obtaining the proper alignment of the carbon brushes with respect to the armature, for grounding the armature, as well as for obtaining an external terminal means for the motor leads for receiving an electrical connector of the power supply cable.

A further object of the present invention is to provide an encapsulated motor with a built-in wiring harness for making internal connections and bringing out the desired terminations.

A further object of the present invention is to provide an encapsulated series motor with the precise positioning of the brush guide holes for optimum electrical performance of the motor.

A still further object of the present invention is to provide a portable motor unit with a watertight connection between a flexible electrical cord and the terminals of the motor.

Briefly stated, in accordance with one form of this invention, a series motor is provided with a molded housing of non-conducting material having a wound stator encapsulated therein. The motor also includes an armature that is positioned within the stator, and the housing has bearing means for supporting the armature for rotation within the stator. The armature includes a commutator as well as shaft portions which are positioned within the bearing means of the motor. The molded housing includes a pair of in-line brush-holding openings for receiving carbon brushes that cooperate with the commutator.

Also encapsulated within the molded housing is a wiring harness that is fastened at its ends to the stator at the opposite sides thereof, while the central portion of the harness encircles one of the motor bearings for the armature shaft. The harness also includes contact means for making electrical contact with the brushes. Lastly, the harness includes electrical terminal means which extends outwardly of the molded housing for receiving an electrical connector of a cable for bringing current to the motor.

This invention not only includes the design of an encapsulated series motor, but also the method of making such a motor in order to obtain the proper alignment of the carbon brushes with respect to the commutator as well as for grounding the armature.

My invention will be better understood from the following description taken in conjunction with the accompanying drawings and its scope will be pointed out in the appended claims.

FIGURE 3 is an elevational view of a subassembly of the motor prior to the encapsulation showing a wound stator provided with the wiring harness embodying the present invention; and FIGURE 4 is a cross-sectional elevational view of a mold in which the molded motor housing is formed with the stator and wiring harness encapsulated therein according to the teachings of the present invention.

Figure 1:
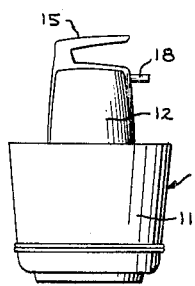
FIGURE 1 is a general view in elevation of a portable food waste disposer for which the present invention is particularly designed.

Turning now to a consideration of the drawings and in particular to FIGURE 1, there is shown a general view o fa portable food waste disposer 10 which is of the type disclosed and claimed in the aforementioned Lindstrom et al. Patent 3,094,291. This unit is formed of two separable parts; namely, a lower hopper 11 and an upper motor unit 12. The disposer 10 is to be used in the kitchen sink over the sink drain, and the faucet is positioned so that water will be running into the hopper during the entire grinding operation. The hopper 11 not only serves as a container for the food waste, but its bottom wall is formed by a comminuting unit (not shown) which consists of a rotating flywheel that is movable within a shredding ring. First, the food waste is loaded into the hopper and then the power unit 12 is fastened over the mouth of the hopper and operatively connected to a vertical shaft (not shown) that rises from the flywheel. When the power unit is energized the food waste is propelled outwardly by centrifugal force against the shredding ring and the waste is comminuted and discharged into a sump beneath the flywheel through a suitable discharge opening and then out the bottom of the hopper into the sink drain.

Figure 2:
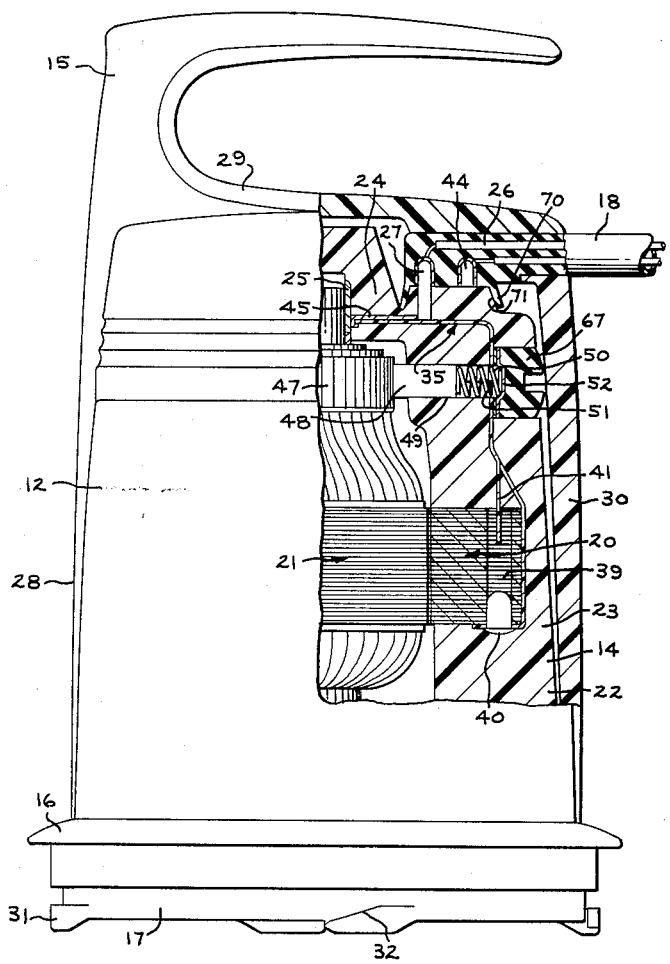
FIGURE 2 is an enlarged view of the removable power unit of the disposer of FIGURE 1 with parts broken away to show the internal nature of the encapsulated series motor embodying the present invention.

FIGURE 2 is an enlarged view of the power unit 12 and it consists of five main parts; namely, the basic motor 14, removable handle 15, a splash guard 16 located adjacent the bottom portion of the motor, a speed reduction gear housing 17 beneath the splash guard, and finally a flexible electrical cord 18 which is adapted to be plugged into the motor 14 and at its other end connected to a wall-mounted convenience outlet.

The present invention is mainly concerned with the design and method of making the motor 14, but mention will be made here of the other elements of the power unit in order to facilitate the understanding of the complete assembly. The motor 14 that is illustrated in the drawing is a series motor having a wound stator 20 and an armature 21 that is located within the bore of the stator as will be best understood hereinafter. The stator 20 is adapted to be encapsulated in a molding compound such as a suitable epoxy resin to form a molded housing 22 which is in the shape of a large inverted cup. The cup has a cylindrical side wall 23 in which the stator is located and a top wall 24 in which is centrally located a bearing member 25 for supporting one end of the armature 21.

The electric cord 18 has a connector 26 which is to be assembled to terminal pins 27 and 44 for the motor leads that extend outwardly of the motor housing 22. This electrical connection must be shielded from the entry of water while water pours over the motor on the way to the hopper so as to avoid short-circuiting the motor and/or blowing the circuit protective fuse or circuit breaker. Accordingly, the handle 15 is of U-shape with portions 28, 29 and 30 that are adapted to encompass the motor housing 22 and be fitted into a close-fitting groove that extends up one side of the housing, over the top, and down the other side. The arms of the U-shape are portions 28 and 30, while the bight portion is portion 29 that extends over the top of the motor housing. The connector 26 of the cord 18 is provided with a sealing lip 70 which telescopes over a boss 71 that is formed around the terminal pins 27. This combination assures a watertight seal over the electrical connection to the motor. In order to bring in the electric cord 18 through the handle, the major portion of the arm 30 of the handle is separable from the remainder of the handle adjacent the cord to provide a strong clamping action against the cord and serve as a strain relief against the resilient jacket material of the cord 18. The lower tips of the arms 28 and 30 are held in place by the annular splash guard 16 which is of resilient material and is clamped between the speed reducer housing 17 and the motor 22 by fastening screws (not shown) in the housing. There are vertical fastening screws adjacent to the bight portion 29 of the handle and they extend into the end wall 24 of the motor housing for the purpose of fastening the sealing elements 70 and 71 securely.

The element 17 has been briefly mentioned earlier as a speed reducing gear mechanism, but it has not been further described since it forms no part of the present invention. It is believed sufficient to mention without illustrating that the armature 21 has a lower shaft portion that is connected to the speed reduction mechanism and the mechanism is provided with a shaft coupling for making a driving connection with the vertical shaft of the comminuting means located within the hopper 11 of the portable food waste disposer as generally illustrated as element 10. This gear housing 17 is of metal construction such as an aluminum die casting, and it is provided with lugs 31 and cam surfaces 32 for making a locking engagement with the throat of the hopper 11. This is necessary because the counter torque of the motor would tend to spin the motor when the comminuting means is loaded with food waste unless the motor were fastened to the hopper to prevent rotation.

Consideration will now be given to the method of encapsulating the wound stator 20 by first referring to the subassembly of FIGURE 3 of the drawings. The stator 20 consists of a stack of laminations which form the stator iron which is of annular shape. There is a pair of diametrically opposed poles (not shown) around each of which is wound the stator winding 34. An important part of the present invention is a wiring harness 35 that is fastened to the stator in FIGURE 3 prior to the time the stator is encapsulated in the epoxy resin. This harness 35 may either be of conducting or non-conducting material, but the preferred embodiment is non-conducting material such as cardboard-like material known as fish paper which is in a narrow strip form of about one inch width. The harness is processed from flat stock scored transversely so it may be folded at right angles to have generally a U-shape with a bight portion 36 and side arms 37 and 38. Turning to FIGURE 4, it will be noted that a vertical hole 39 is formed through the stator laminations at each side of the stator and the tips of the arms 37 and 38 are brought down the sides of the stator to underlie the openings 39 so that a rivet member 40 may be applied through a suitable opening in each tip and into the corresponding opening 39 for firmly attaching the harness to the stator. In order to stabilize the harness 35, a portion 41 of each arm 37 and 38 is lanced inwardly to extend with a force fit into the top portion of the corresponding opening 39 in the stator so as to resist the collapsing of the harness out of shape during the handling of the stator prior to the molding operation.

Another alternative is to eliminate the rivet connection 40 entirely and to dimension the lower tip of each arm 37 and 38 so that it has a force fit in the top of the corresponding opening 39 of the stator and is of sufficient rigidity to retain the general shape of the harness prior to the molding operation. These rivets 40 would be used primarily when the harness 35 were of conducting material or provided with a printed circuit in order to obtain ground continuity between the stator and the bearing 25 of the upper end of the armature 21 and the third wire grounding conductor of the electric cord 18.

Instead of using the harness as a printed circuit board, the other alternative is to merely ground the armature as shown; namely, to use a contact 45 around the bearing and with a grounding terminal pin 27 at its other end as is seen in FIGURE 2. Flexible leads 42 and 43 are connected between the stator and the wiring harness. In the preferred embodiment there is a pair of leads 42 between the terminal pins 44 and the stator, and another pair of leads 43 between the stator and the brushes of the motor. The harness include a series of three terminal pins 27, 44 and 44. One of the pins 44 is hidden behind the other since the three pins are positioned in a triangular formation in plan view. The terminal pins 44 represent current carrying members while the third pin 27 is a grounding pin which is electrically joined to the contact ring 45 that encircles the upper bearing 25 for the armature as is best seen in FIGURE 2.

The armature 21 also includes a commutator 47 which is acted upon by a pair of carbon brushes 48 which are supported in suitable diametrically opposed openings 49 of square or rectangular cross-section in the molded housing. Each brush is spring biased into rubbing engagement with the commutator by a backup spring 50. A flexible lead wire 51 is connected to the back end of each brush while the opposite end of the lead is fastened to a terminal disc 52. A spring member 50 extends through a suitable opening in each side arm 37 and 38 of the harness, and around this opening is formed a contact ring 53 as best seen in FIGURE 3 for making electrical connection with the terminal disc 52.

Looking back at the assembled view of FIGURE 2, the coil springs 50 that back up the carbon brushes 48 are held in place by tight fitting rubber plugs 67 which are confined in enlarged openings behind the spring and held in place by the side arms 28 and 30 of the handle 15. This contact ring is provided with a spade terminal 54 for receiving the snap-on terminal 55 of the lead wire 43. Accordingly, the wiring circuit includes the cord 18 and pins 44, the pair of lead wires 42, the stator windings 44, and lead wires 43 and joining the stator and brushes 48, the commutator 47, and the grounding connection with the armature by way of the bearing 25 and contact ring 45 and grounding pin 27.

Attention will now be given to the cross-sectional view of FIGURE 4 of the mold in which the housing 22 is cast with the stator 20 and wiring harness 35 encapsulated therein. The mold has two main elements, mainly an inner center plug assembly 56 and an outer mold shell 57. The center plug assembly 56 is a hollow precision part that has an enlarged base 58 and a snug-fitting plug portion 59 which fits into the bore 60 of the stator. Several diameters are turned on the plug portion 59 so as to establish a narrow shoulder 61 for supporting the stator. The shape of this center plug defines the motor interior for receiving the armature 21 as can be best understood by comparing FIGURES 2 and 4. The top of the center plug 56 has a cylindrical boss 62 which accurately defines a bearing bore for receiving the upper bearing 25 of the motor. Accuracy is important here so as to obtain better concentricity between the outside diameter of the armature and the inside diameter of the stator to have a uniform air gap. It should be noticed that the boss 62 of the center plug assembly 56 is disposed within the contact ring 45 of the wiring harness. Accordingly, the diameter of the boss 62 is equal to the outer diameter of the bearing 25 so that there will be a good electrical connection between the bearing and the contact ring 45 when the bearing is subsequently pressed into the cavity formed by th boss 62 as best seen in FIGURE 2.

It is most important that the carbon brushes 48 be aligned properly with each other for riding engagement on the commutator 47 for this produces the optimum electrical performance of the motor and gives significantly longer brush life than if the brushes were supported in holders that are not properly related to each other within close tolerances. This proper alignment is obtained by passing a square or rectangular bar 64 directly through the center plug and on a line that coincides with the intended longitudinal axis of the brushes 48. Moreover, the opposite ends of the square bar 64 extend through suitable openings in the contact rings 53 of the wiring harness 35 as is best seen in FIGURE 4. Finally, a rubber plug 65 is fitted over each end of the square bar 64 so as to seal the ends of the bar and make contact with the inner surface of the mold 57 so as to facilitate the ease of removing the bar from the casting and from the center plug after completing the molding operation. Another rubber plug 66 is fitted over the tips of the terminal pins 27 and 44 so that only the lower portions of the pins will be buried in the molding compound by the boss 71 and the tips will be free to receive the connector 26 of the electric cord 18. The liquid epoxy resin is added to the mold by means (not shown) and the mold is sealed so that the resin may be cured for a sufficient length of time and at a sufficient temperature and pressure until the compound hardens into a finished casting. It will be noted that it is an easy matter to separate the mold shell 57 from the casting by pulling the center plug from the mold shell. This withdrawal force acts through the square bar 64 for stripping the casting with the center plug assembly from the mold shell. The rubber plugs 65 are then removed and the bar 64 is pushed out. The motor casting may then be removed from the center plug 56.

Having described above my invention of a novel design of an encapsulated series motor and method of making same it will be readily apparent to those skilled in this art that I have devised a simple method of bringing out the terminations of the electrical lead wires of the motor. The design is both waterproof and simple to make with automated techniques in a high production factory so as to provide precision castings of the encapsulated stator. Moreover, it is apparent that the armature is accurately positioned within the encapsulated stator by the fact that one of the motor bearings is formed integrally with one wall of the molded housing to insure proper concentricity between the outer diameter of the armature and the inner diameter of the stator.

Modifications of this invention will occur to those skilled in this art and therefore it is to be understood that this invention is not limited to the particular embodiments disclosed, but that it is intended to cover all modifications which are within the true spirit and scope of the invention as claimed.

What I claim as new and desire to secure by Letters Patent of the United States is:

1. A series motor comprising:
   (a) a molded housing formed of non-conductive material,
   (b) a stator encapsulated within said housing,
   (c) a rotatable armature positioned within said stator and including a commutator,
   (d) a bearing means to support said armature within said housing including an armature shaft bearing imbedded in one wall of said molded housing,
   (e) a generally U-shaped non-conductive harness encapsulated within said molded housing,
   (f) said harness having an opening therethrough to receive said armature shaft bearing,
   (g) said harness being connected to the stator at opposite sides thereof,
   (h) said housing having a pair of diametrically opposed openings therethrough, and
   (i) a carbon brush disposed in each of said diametrically opposed openings for cooperation with the commutator,
   (j) electrical contact means supported by said harness for making engagement with each brush as well as with said armature shaft bearing.

2. A series motor comprising:
   (a) a molded housing formed of non-conductive material,
   (b) a stator encapsulated within said housing,
   (c) a rotatable armature positioned within said stator and including a commutator,
   (d) bearing means to support said armature within said housing including an armature shaft bearing imbedded in one wall of said molded housing,
   (e) a generally U-shaped non-conductive harness encapsulated within said molded housing,
   (f) said harness having an opening therethrough to receive said armature shaft bearing,
   (g) said harness being connected to the stator at opposite sides thereof,
   (h) said housing having a pair of diametrically opposed openings therethrough,
   (i) a carbon brush disposed in each of said diametrically opposed openings for cooperation with the commutator,
   (j) electrical contact means supported by said harness for making engagement with each brush as well as with said armature shaft bearing, and
   (k) conducting means for making engagement with said contact means,
   (l) said harness supporting electrical terminals extending through the molded housing to receive an electrical connector to energize the motor.

3. An electric motor comprising:
   (a) a molded housing formed of non-conducting material with a wound stator encapsulated therein,
   (b) a rotor positioned within said stator and supported by bearing means within said housing,
   (c) a generally U-shaped non-conductive harness encapsulated within said housing and having a bight portion,
   (d) said harness having an opening therethrough to receive said bearing means,
   (e) said harness being connected to the stator at opposite sides thereof, (f) three terminal pins mounted on the bight portion of said harness,
(g) one of said pins being electrically connected to said bearing means to serve as a grounding connection for the rotor,
(h) the other two of said terminal pins being electrically connected to the windings of the stator,
(i) said pins extending through said housing to receive an electrical connector,
(j) said housing having a tapered boss at the base of said three terminal pins adapted to cooperate with an electrical connector having a sealing lip to telescope over the boss, and
(k) a plate member fastened over the connector to hold the connector down on the boss to form a water-tight electrical connection.

References Cited by the Examiner

UNITED STATES PATENTS

| | | | |
|---|---|---|---|
| 1,875,205 | 8/32 | Apple | 310—43 X |
| 1,881,344 | 10/32 | Apple | 310—43 X |
| 1,893,261 | 1/33 | Apple | 310—43 X |
| 1,934,903 | 11/33 | Apple | 310—43 |
| 1,982,279 | 11/34 | Apple | 264—275 |
| 2,286,993 | 5/42 | Naul | 310—43 X |
| 2,291,775 | 8/42 | Tucker | 310—71 X |
| 2,773,209 | 12/56 | Kirkwood | 310—43 X |
| 2,782,720 | 2/57 | Dochterman | 310—43 X |
| 2,944,297 | 7/60 | Maynard | 310—71 X |

ORIS L. RADER, *Primary Examiner.*

MILTON O. HIRSHFIELD, *Examiner.*